Aug. 7, 1928.   1,679,512
O. ZERK, NOW BY JUDICIAL CHANGE OF NAME O. U. ZERK
LUBRICATING APPARATUS
Filed March 14, 1921
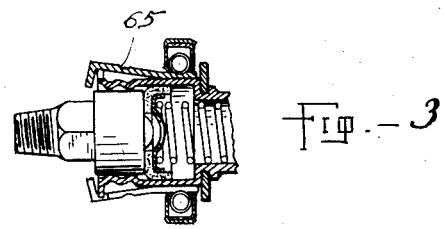
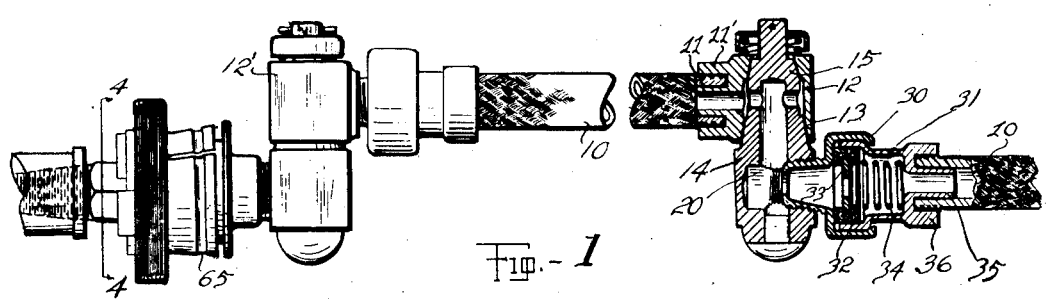
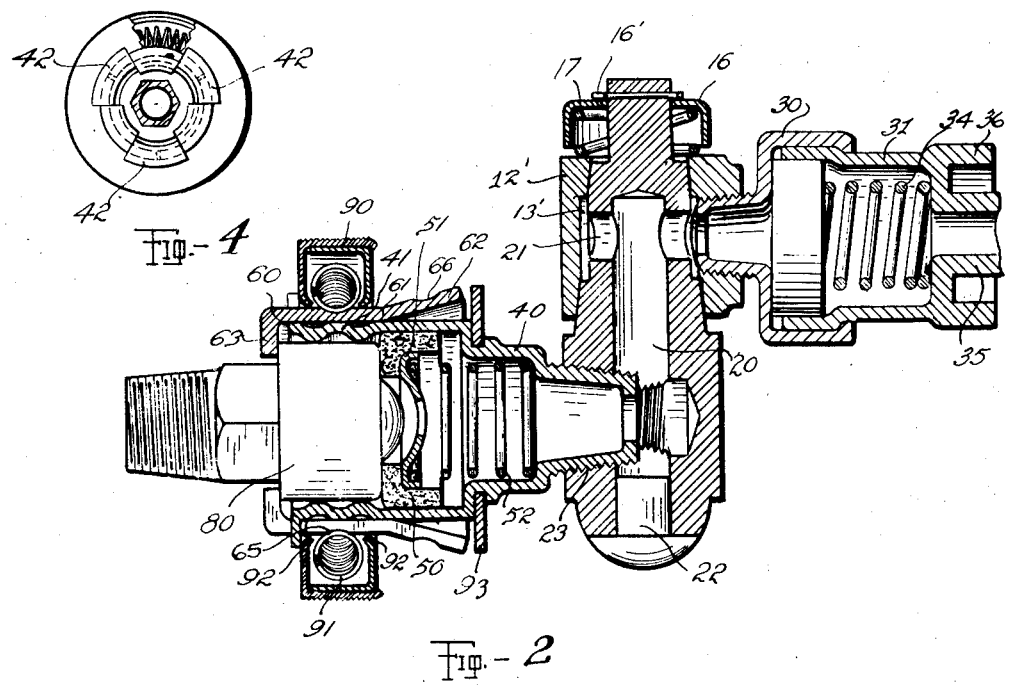
INVENTOR
Oscar Zerk
By Baker & Macklin,
ATTORNEYS Patented Aug. 7, 1928.

1,679,512

UNITED STATES PATENT OFFICE.

OSCAR ZERK, NOW BY JUDICIAL CHANGE OF NAME OSCAR ULYSSES ZERK, OF CLEVELAND, OHIO, ASSIGNOR, BY MESNE ASSIGNMENTS, TO THE BASSICK MANUFACTURING COMPANY.

LUBRICATING APPARATUS.

Application filed March 14, 1921. Serial No. 452,126.

My invention relates to connectors for feeding grease, oil or other lubricants and is designed particularly for delivering such lubricant from a source of supply, to a grease or oil cup.

One object is the provision of a jointed connection so as to connect a grease cup and a source of supply, in the various relative positions of these parts so as to allow the convenient placing of the source of supply regardless of the position of the cup.

Another object is the provision of such a connection which will enable lubricant under considerable pressure to be delivered therethrough without leakage.

Another object is the provision of a connection having sealing means therein which are arranged to be sealed more tightly as the pressure increases inside the connection.

Another object is the provision of a connection which shall be readily accessible and small, so as to readily get at grease or oil cups in out of the way places. In the past an ordinariy flexible hose has been sometimes used, but where such a hose is used it is likely to kink and so shut off communication or even to break when it is turned unless a very long hose is used so as to allow gradual turns, but the carrying of such a long hose is very inconvenient and my articulated connection enables sharp turns to be made so as to get at parts difficult of access, without any danger of cutting off the communication in the connecting members.

Another object is to provide such a device which may be econveniently folded and carried in a tool box, or other small container. Other objects will be apparent in the course of the following description and claims.

Referring to the drawings, in which an embodiment of my invention is illustrated, Fig. 1 is a fragmentary side view partly in section, of such a device; Fig. 2 is fragmentary view in section and on an enlarged scale of one end of the device. Fig. 3 is a view of a portion of Fig. 2 on the same scale as Fig. 1, the gripping jaws being shown in open position, and Fig. 4 is a section taken on line 4—4 of Fig 1, looking in the direction shown by the arrows.

The device as illustrated consists of lengths of tubing to each end of which is attached a socket having a plug swivelled therein. The plug connected to the outer end of one of the end lengths of tubing has connected thereto a jaw carrying member having means for connection to a grease cup or other member, while the other end of the tubing may be provided with means adapted for connection with a grease gun, or other source of supply.

Referring to the parts by reference numerals, the tubing 10, which may consist of any approved form of tubing, and may advantageously be flexible, is connected at one end between the bosses 11, 11′ of the socket member 12. This tube may be conveniently connected to this socket by placing lead in the space between the bosses and sweating the tube 10 to the socket member. In this operation the long inner boss 11 prevents any of the lead from passing into the interior of the socket member. This socket member has formed therein a substantially conical opening 13, enlarged at the central portion as shown at 13′, in which a conical portion 15 of a plug 14 extends, whereby this socket and its plug are swivelled together.

In order to provide means for holding these parts in tight fitting relation this plug 14 is shown as provided with a reduced end extending through the opening in the socket and this end is surrounded by a collar 16 which may be retained in position by suitable means such as a cotter pin 16′. A spring 17 bearing at one end upon the socket member and at its other end on the inner face of the collar, provides a means for holding the plug in tight fitting relation with the socket member. The foregoing description also applies to plug 14 shown at the left in Fig. 1, and which is similarly connected to the socket 12′.

An opening 20 extends longitudinally of each plug, and communicates by means of the transverse openings 21 with the socket member and tubing. The enlargement 13′ of opening 13 insures communication of the opening 20 with the interior of the tubing in any position in which either plug is turned relatively to its socket member. The opening 20 extends from the end of the plug farthest away from the socket and this end is closed by a suitable means such as a stop 22. Adjacent this end of the plug 14 a transverse threaded opening 23 is tapped, which communicates with the opening 20 and is adapted to receive a threaded nipple.

The socket member 12′ differs from socket 12 in that it is provided with a threaded opening to receive the pipe threaded nipple of a cup 30 which has swivelled therein the cup of a member 31. An annular washer 32 having a cylindrical side portion is slidably mounted inside of this member and is adapted to seat upon the shoulder formed by the bottom of the cup of member 30. A ring 33 of hard material is seated on this washer and provides an abutment for the spring 34, the other end of which bears on a shoulder in member 31 whereby the spring holds the washer seated upon the bottom of cup 30. It will be seen from this construction that any pressure within the members 30 and 31 will force the washer 32 into tighter seal with these members and prevent leakage of material between them.

The member 31 is provided with the bosses 35 and 36 corresponding to bosses 11 and 11' of socket 12, whereby the member 31 is adapted for attachment to the tubing 10 in the same manner in which that socket is connected.

The plug 14 shown at the right in Fig. 1 has threaded directly therein the nipple of another cup member 30 swivelled to a cup member 31 which is connected with a tubing section 10'. It will be apparent that the other end of this tubing 10' may be connected to a socket 12 swivelled in another plug 14, and that by continually connecting plugs and tubing in the same manner as the plug at the right in Fig. 1 is connected, the articulated connection may be made as long as may be desirable.

The end tubing may carry means for direct connection to a source of lubricant supply or it may have a plug at its end provided with a suitable attacking means. This means may, if desired, be of the same form as the member 40, which is illustrated on the left in Figs. 1 and 2, and is especially designed for connection to a grease or oil cup.

In the plug shown at the left in Fig. 1, there is threaded the nipple of a cup member 40. Within this member the washer 50 is seated, this washer being similar to washer 32 already described. A member 51 which may be made of metal stamping provides a seat for one end of a spiral spring 52, the other end of which abuts against the interior shoulder of member 40, whereby the spring tends to force the washer 50 toward the left as seen in Fig. 2. Adjacent its outer end the member 40 has the circumferentially extending corrugations 41. These serve the double purpose of strengthening this member and also of preventing the escape of the washer 50.

At its outer end this member 40 is turned radially outwardly, certain portions being cut away, whereby flanges or lugs 42 are formed having spaces therebetween. The purpose of these openings is to allow the projection of retaining jaws therethru which are provided as follows:—Surrounding the outer end of the member 40 are the three jaw carrying members 60, which are adapted when placed edge to edge, to form a substantially cylindrical surface. The inner end of each member 60, however, is flared or bent outward radially, as at 61, to form the flared portion 62.

At the other ends of the member 60 a projection 63 is formed by cutting away a portion of the material from each edge of member 60. This projection is then bent inward radially so as to extend at right angles to the portions 60 and through one of the openings between the flanges 42 already described. It will be seen from this description that the jaws 63 are thus adapted to extend inward and retain the head of a grease cup 80 in position within the member 40, since the ridges 61 of the members 60 form a fulcrum on which these members may be rocked.

In order to provide means for manipulating these jaws, an annular member or sleeve 90 is shown surrounding the jaw carrying members 50 and slidable longitudinally of these members. The member 90 may be made up of two parts, if desired, as shown, and may have its outer periphery milled to facilitate its manipulation. Within the member 90 is mounted the endless spiral spring 91, which is in the form of an anchor ring.

At their inner periphery 92 each of the members which constitute the member 90 are preferably turned slightly towards each other. This inner periphery of member 90 is of such size as to abut the members 60 and regulate the position of the jaws 63 and the principal object of the spring 91, is to prevent accidental displacement of the member 90, though it will also tend to hold the jaws 63 in position.

The function of the member 90 is as follows:—If it is desired to move the jaws for instance from the gripping position, as shown in Fig. 2, to the open position, as shown in Fig. 3, the operator slides the member 90 longitudinally of the members 60, and toward the right as seen in Fig. 2. This motion of the member 90 will push the spring 91 out of the notch 65, and as the member 90 moves on to the flared portions 62 of the jaw members, the inner periphery of member 90 will rock members 60 about the fulcrums 61, and will thereby move the jaws to the open position, as seen in Fig. 3. When the spring 91 arrives at the notch 66 it will slip into this notch and prevent accidental displacement of annulus 90.

In order to prevent the accidental loss or displacement of the member 90 or of the jaws 60 from either end of the cup member 40, a ring 93 is held by means of shoulders on the member 40. The escape of these jaw members 60 or the annular member 90 from the other end of the cup is, of course, prevented by the flanges 42.

In operation it will be seen that the connector which I have described will serve to connect a grease cup with a source of supply regardless of the relative position of these members. When the lubricant is forced through this connector under pressure, the washers at the swivel joints will be forced up tightly against their abutting members to prevent leakage at these points.

The use of the double swivel at one end of each tube provides a universal connection between the tubes and plugs, and also between the various adjacent plugs. It will therefore be seen that each plug may be turned at any angle in relation to the other plugs. The swivel connection of the members 30 and 31 prevent any twist being exerted on the tube. It will be seen that with this construction the tube may, if desired, be made of non-flexible piping, in which case the swivel joints will still allow the connector to have its adjacent tubes turned to various angles to form a connection between a source of lubricant supply and a grease or oil nipple.

While I have described a specific device embodying my invention, it is apparent that many forms of devices embodying the principles thereof might be made and the foregoing description is, therefore, to be taken as illustrative of a specific embodiment of the invention rather than as restrictive of its character and scope.

Having thus described my invention, I claim:—

1. In a device of the class described, a flexible tubing, a socket member connected to each end thereof, a plug swivelled in each socket and having an opening communicating with said tubing, a threaded opening in one of said plugs communicating with said first named opening, a cup member having a nipple threaded in said opening, a second member having a cup member seated in said first cup member, a washer between said cup members and slidable in said cup members, means for holding said washer on the bottom of one of said cup members, and means carried by the other socket for effecting a quick detachable connection with a lubricant receiving member.

2. Apparatus of the class described comprising, in combination, a flexible conduit, a socket member connected to each end thereof, a plug swiveled in each socket and having an opening communicating with said conduit, a threaded opening in one of said plugs communicating with said first named opening, a cup member having a nipple threaded in said threaded opening, a second member having a cup member seated in said first cup member, a washer between said cup members and slidable in said cup members, and means for holding said washer on the bottom of one of said cup members.

3. In apparatus of the class described, a conduit, a socket member secured thereto and having an opening communicating therewith, said socket member having a tapered transverse bore communicating with said opening, a tapered plug swiveled in the tapered bore of said socket and extending from both ends thereof, said plug having a bore extending inwardly from one end thereof and terminating short of the other end, a transverse passage connecting the inner end of said bore with the opening in the socket member, a transverse opening in said plug communicating with the bore therein adjacent the outer end of said plug, said last mentioned opening being threaded to receive a co-operating part of a second conduit, a member for closing the outer end of the bore in said plug, and a spring confined between said socket member and a part carried by said plug and serving to maintain said plug and socket member in co-operating relation.

In testimony whereof, I hereunto affix my signature.

OSCAR ZERK.